No. 730,429. Patented June 9, 1903.

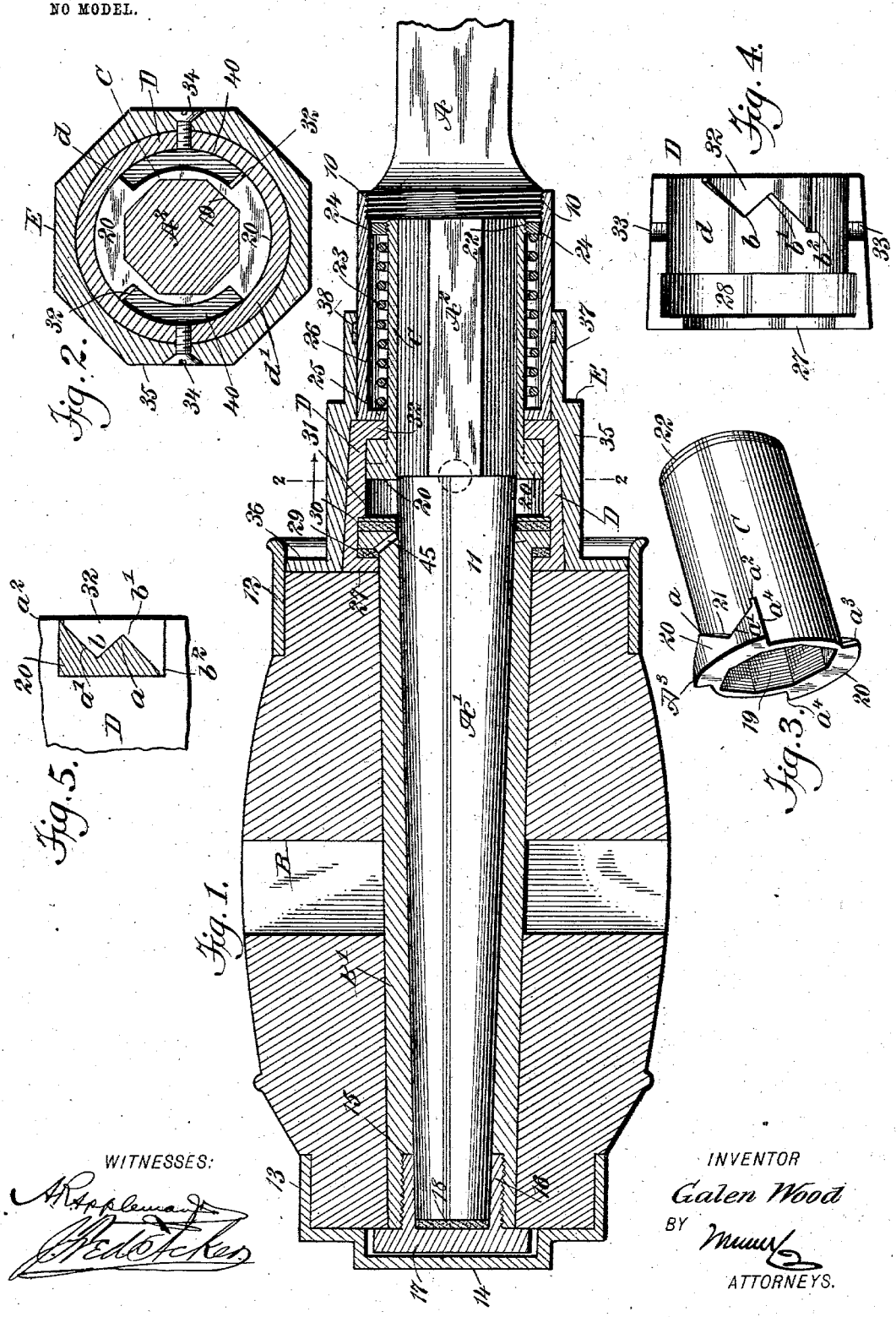

UNITED STATES PATENT OFFICE.

GALEN WOOD, OF BALLARD, WASHINGTON, ASSIGNOR OF ONE-THIRD TO WILEY MOUNTJOY, OF TWIN BRIDGES, MONTANA.

WHEEL-FASTENER AND AXLE-PROTECTOR.

SPECIFICATION forming part of Letters Patent No. 730,429, dated June 9, 1903.

Application filed July 22, 1902. Serial No. 116,535. (No model.)

*To all whom it may concern:*

Be it known that I, GALEN WOOD, a citizen of the United States, and a resident of Ballard, in the county of King and State of Washington, have invented a new and Improved Wheel-Fastener and Axle-Protector, of which the following is a full, clear, and exact description.

The purpose of the invention is to provide a construction whereby to quickly place and hold a wheel-hub upon an axle-spindle without the use of a nut, the wheel being fastened from the rear instead of from the front, and to provide perfect protection for the end of the axle against all foreign substances, such as sand, dust, &c.

Another purpose of the invention is to provide a means for shortening the projection from the hub without shortening the spindle and under such circumstances to bring the front projection of the hub practically within the plane of the dish of a wheel.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a longitudinal vertical section through the hub of a wheel having the improvement applied and through the means for holding the hub upon the axle-spindle, a portion of the axle and the spindle appearing in side elevation. Fig. 2 is a transverse section taken practically on the line 2 2 of Fig. 1. Fig. 3 is a detail perspective view of the locking-sleeve for the hub, which sleeve is carried by the axle. Fig. 4 is an inner face view of one section of the locking-sleeve which is carried by the hub; and Fig. 5 is an inner face view of a portion of the sleeve shown in Fig. 4, illustrating the locking projection and a section through a mating projection on the locking-sleeve of the axle, showing the manner in which the two projections interlock when in locking engagement.

The axle A is provided with the customary spindle A', and between the axle and the spindle an intermediate section $A^2$ is provided polygonal in cross-section, as is best shown in Fig. 2. Where the polygonal section $A^2$ connects with the axle, an exteriorly-threaded collar 10 is produced, as is shown in Fig. 1. The hub B is provided with an axle-skein B', secured therein in any approved manner, which skein has a taper corresponding to that of the spindle and extends flush with the outer end of the hub, but beyond its inner end, and at the inner end of the axle-skein B' an exterior annular flange 11 is formed. The inner end of the hub B is provided with the usual band 12; but at the outer end of the hub a cap-band 13 is securely fitted, which latter band completely closes and covers the outer end of the hub and is provided with a central offset 14 when desired. An annular recess 15 is made in the bore of the axle-skein at its outer end, and the side wall of the said recess is threaded to receive the exteriorly-threaded portion of a nut 16, interiorly tapered to fit over the outer end of the axle-spindle A'. This nut 16 is provided with a head 17, which when the nut is screwed home bears against the outer end surface of the hub, thus preventing the skein from having longitudinal movement in the hub and at the same time serving to protect and conceal the outer end of the spindle. The nut 16 is protected and the outer end of the hub is covered, as stated, by the cap-band 13, and the front projection from the hub is by such means shortened without lessening the length of the spindle, and the front projection of the hub is brought practically within the plane of the dish of the wheel. The end thrust of the spindle in the hub is taken up by a packing 18, located between the outer end of the spindle and the head 17 of the nut 16, as is shown in Fig. 1.

I desire it to be understood that the axle-skein B' may be simply a cast skein closed at its outer end, which end sets flush with the outer end of the hub, not requiring a cap-nut or other device for closing it. Corresponding to this form the cap-band of the hub would not require the offset 14, but would rest flat against the end of the hub, reducing the hub projection to a minimum, which is the point sought to be gained. The form of the skein shown in the drawings is designed for use in the event anything additional to the setting of the skein in the hub is desired to prevent longitudinal movement of the skein in the hub.

A locking-sleeve C (shown in Fig. 3) is adapted to have end movement on the polygonal intermediate section $A^2$ of the axle A, the inner wall 19 of the sleeve being correspondingly polygonal; but the outer surface of the sleeve is smooth and cylindrical, except that at the rear or inner end of the sleeve an exterior thread 22 is produced, and at its forward or outer end two exterior cam-lugs 20 are formed diametrically opposite each other. The length of these cam-lugs is circumferentially of the sleeve, and their forward side surfaces, which are flat, are flush with the forward end of the sleeve C, while their rear side surfaces 21 are of angular formation, being formed with a triangular projection $a$, pointing in direction of the rear, and a correspondingly-formed recess $a'$, having a forward bend, as is clearly shown in Fig. 3, and at the outer end of the recess $a'$ of the cam-lug 20 a rearwardly-directed stop-finger $a^2$ is formed. In the further formation of each cam-lug 20 the end $a^4$, to which the outer portion of the recess $a'$ leads and at which the stop-finger $a^2$ is located, is wide and straight longitudinally of the sleeve, while the opposing end wall $a^3$ is rearwardly beveled, the bevel forming one side of the aforesaid projection $a$.

As has been stated, the sleeve C has sliding movement upon the intermediate section $A^2$ of the axle; but such movement is against the tension of a spring 23, coiled around the sleeve, as is shown in Fig. 1, and having bearing at its rear end against a metal ring 24 on the threaded surface 22 of the sleeve C. The forward end of the spring 23 bears against a flange 25 at the forward end of the cylindrical jacket or casing 26, the rear end of which is screwed upon the threaded collar 10 on the axle. The flange 25 of the jacket or casing rests loosely upon the outer surface of the locking-sleeve C.

The hub B is also provided with a locking-sleeve D. This sleeve is made in two duplicate sections $d$ and $d'$, as is shown in Fig. 2, one of the sections being shown in detail in Fig. 4. The sleeve D is so made in order that it may be readily placed in position and conveniently removed from position when required. The exterior surface of the sleeve D is tapered from the front rearwardly and inwardly, as is shown in Fig. 1, the sleeve being of greatest exterior diameter at the front; but interiorly the diameter of the sleeve D is constant.

Each section of the locking-sleeve D for the hub is provided with a forward inwardly-directed flange 27, adapted to abut against the inner face of the hub B and to rest upon the rear projecting portion of the axle-skein B'. Each section of the sleeve D is also provided with an interior segmental recess 28, extending from side to side of a section, as is shown in Fig. 4, so that when the sections $d$ and $d'$ are brought together the recess 28 is annular. The flanges 27 of the sections of the sleeve D form one wall of the recesses 28.

The sections $d$ and $d'$ of the locking-sleeve D for the hub when placed in position on the axle-skein B' are stiffened and are held from having end movement, while they are free to turn on the skein through the medium of a packing or gasket 29, which fits in the space between the flanges 27 of the sleeve-sections and the flange 11 of the axle-skein B', and another and wider gasket 30 is placed at the rear of and in contact with the rear face of the axle-skein B', together with a metal washer 31, which bears against the rear face of the gasket 30, and the said gaskets 29 and 30, the flange 11 of the axle-skein, and the metal washer 31 all enter the recesses 28 in the sections of the locking-sleeve D for the hub and completely fill said recesses, as is clearly shown in Fig. 1. The special design of the gasket 30 is to prevent the escape of lubricating material and the entrance of dust or other foreign matter, and to this end it hugs the axle closely and also presses firmly against the inner walls of the locking-sleeve D.

Each section $d$ and $d'$ of the sleeve D is provided with an interiorly-located cam-lug 32, flush with the rear ends of the sections, and when the sleeve-sections $d$ and $d'$ are together the cam-lugs 32 are diametrically opposite. Each cam-lug 32 is of the same formation and corresponds exactly to the formation of the cam-lugs 20 on the axle-sleeve C, with which they are to engage; but the angular sides of the lugs 32 are their forward sides and include a triangular projection $b$, adapted to enter a recess $a'$ in the cam-lug 20, and a triangular recess $b'$, adapted to receive the projection $a$ of a cam-lug 20, together with a stop-finger $b^2$, and when two cam-lugs 20 and 32 are in interlocking engagement by reason of the angular formation of their engaging surfaces they will positively remain in such position until purposely separated to remove the hub from the axle.

The stop-fingers $a^2$ and $b^2$ of the cam-lugs 20 and 32 effectually prevent the mating cam-lugs from passing beyond locking position, but offer no obstruction to the movement of the cam-lugs past each other, so that one cam can completely clear the other. In the locking position of mating locking-cams 20 and 32 the stop-fingers of one cam bear against the beveled end of the other cam, as is clearly illustrated in Fig. 5.

Correspondingly-located threaded recesses 33 are produced in the longitudinal edges of the sleeve-sections $d$ and $d'$ to receive screws 34, and these screws are passed through the body portions 35 of an operating-sleeve E, which body portion receives the locking-sleeve D, extending from end to end thereof, and is exteriorly polygonal and interiorly tapering, whereby to closely fit to the locking-sleeve D, and when the operating-sleeve E is turned by a wrench or otherwise the locking-sleeve D is also turned in the same direction.

The body 35 of the operating-sleeve E is provided with a flange 36 at its forward end, which loosely fits in the hub-band 12 and protects the rear end of the hub. The body of the operating-sleeve E is further provided with a rear extension 37, fitting loosely over the jacket or casing 26, being provided with a packing 38 to prevent the entrance of dust and a waste of lubricating material. When the hub is locked upon the axle by the mechanism described, corresponding cam-lugs 20 and 32 will be in locking engagement, as shown in Figs. 1, 2, and 5, and the hub will remain on the spindle and will turn freely thereon, as if mounted in the simplest manner. When the hub is to be removed from the axle-spindle, the operating-sleeve E is turned to the left, whereupon the cam-lugs 32 will pass up the cam-lugs 20, with which they were in locking engagement, and will be brought opposite the spaces between the said cam-lugs 20, which spaces are clearly shown in Fig. 2 and are designated by the numeral 40. At this time the hub, with its locking-sleeve and operating-sleeve attached, can be drawn freely from off the spindle and the spring 23 will return the axle-sleeve C to its rear or normal position, as when opposing cam-lugs 20 and 32 are in locking engagement. The said axle-sleeve C is drawn forwardly, the spring 23 being placed under tension. When the hub is to be again placed on the spindle, it is simply slipped thereon, and the cam-lugs 32 are made to enter the said spaces 40 between the cam-lugs 20 on the axle-sleeve C. The operating-sleeve E is then turned to the right, carrying the hub-locking sleeve D in the same direction and causing the cam-lugs 32 to ride up upon the cam-lugs 20, at the same time drawing the axle-sleeve C forward, and the moment that the projections of mating cam-lugs are opposite the recesses they are adapted to enter the spring 23 will immediately draw the locking-sleeve C for the axle rearward, thus holding mating cam-lugs 20 and 32 in positive locking engagement.

An oil-cell 45 is made in the axle-skein B' where the flange 11 of the skein meets the body for the purpose of lubricating the washer 29.

Having thus described my invention, I claim as new and desire to secure by Letters Patent—

1. In vehicles, an axle having a spindle-section and a polygonal section; a hub mounted to turn on the spindle-section; an axle-sleeve with polygonal opening to fit the polygonal section of the axle and adapted to move longitudinally thereon; and means connecting the axle-sleeve with the hub and axle whereby to hold the hub normally locked in rotatable position on the spindle as and for the purpose set forth.

2. In vehicles, an axle, an axle-skein closed at its outer end, a locking-sleeve mounted to revolve upon the said skein, a retaining mechanism carried by the axle and arranged for locking engagement with the locking-sleeve, a spring for holding said sleeve normally locked in engagement with the retaining mechanism, and exteriorly-operated means for releasing the retaining mechanism from locking engagement with the locking-sleeve on the axle-skein, substantially as described.

3. In vehicles, an axle having a spindle-section and a polygonal section; a skein mounted to revolve on said spindle-section; a locking-sleeve mounted to revolve upon the said skein; an axle-sleeve carried by the polygonal section of the axle, longitudinally movable thereon arranged for locking engagement with the locking-sleeve, and a spring for holding said sleeve normally locked in engagement with the retaining mechanism and permitting the same to be unlocked; and exteriorly-operated means for releasing the retaining mechanism from locking engagement with the locking-sleeve on the axle-skein as specified and for the purpose set forth.

4. In vehicles, the combination with an axle-skein having a flange at its inner end, a locking-sleeve mounted to turn around the flanged portion of the axle-skein, the said locking-sleeve being provided with interior locking-cams having their forward edges angular, the said forward edges comprising triangular projections and triangular recesses, and an operating-sleeve attached to the said locking-sleeve, of an axle, and a locking-sleeve having sliding movement on the axle and provided with exteriorly-located locking-cams, corresponding in formation to the locking-cams on the locking-sleeve for the axle-skein, the angular faces of the cams on the axle-sleeve facing in an opposite direction to the corresponding surfaces of the cams carried by the skein-sleeve, as and for the purpose specified.

5. In vehicles, the combination with an axle-skein, a sleeve mounted to turn on the axle-skein, oppositely-disposed cams located upon the inner face of the skein-sleeve, each cam having an angular forward surface including a triangular projection, a triangular recess and a stop-finger adjacent to the recess, and an operating-sleeve attached to the skein-sleeve, of an axle, a spring-controlled sleeve mounted to slide upon the said axle, being held from turning thereon, and cams located upon the exterior of the said axle-sleeve, which cams correspond in number and in shape to the cams on the skein-sleeve, the triangular surfaces of the cams of the axle-sleeve facing in an opposite direction to the corresponding surfaces of the cams on the skein-sleeve, a housing for the spring of the axle-sleeve, which housing is secured to the said axle, and an extension from the operating-sleeve, loosely passed around the said housing, for the purposes described.

6. In vehicles, an axle, an axle-skein having an annular outturned flange at its inner end; a locking-sleeve made in sections and having an inwardly-extending annular flange overreaching the flange of the axle-skein to engage the same and prevent outward longitudinal movement thereof; locking means carried by said sleeves; an axle-sleeve having locking means adapted to coöperate with the said locking means of the locking-sleeve; a cylindrical jacket secured to the axle; and a spring between said jacket and axle-sleeve for holding the latter normally in locking engagement with the locking-sleeve, as specified and for the purpose set forth.

In testimony whereof I have signed my name to this specification in the presence of two subscribing witnesses.

GALEN WOOD.

Witnesses:
    MAUD MILLER,
    F. M. DeMoss.